United States Patent
Ryu et al.

(10) Patent No.: US 11,133,877 B2
(45) Date of Patent: Sep. 28, 2021

(54) METHOD AND APPARATUS FOR DETERMINING PATHLOSS IN WIRELESS COMMUNICATION SYSTEM

(71) Applicant: Samsung Electronics Co., Ltd., Suwon-si (KR)

(72) Inventors: Hyunseok Ryu, Suwon-si (KR); Sungjin Park, Suwon-si (KR); Jonghyun Bang, Suwon-si (KR); Jeongho Yeo, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 47 days.

(21) Appl. No.: 16/537,438

(22) Filed: Aug. 9, 2019

(65) Prior Publication Data

US 2020/0052802 A1 Feb. 13, 2020

(30) Foreign Application Priority Data

Aug. 9, 2018 (KR) .......................... 10-2018-0092857

(51) Int. Cl.
*H04B 17/309* (2015.01)
*H04W 24/08* (2009.01)
*H04W 72/04* (2009.01)

(52) U.S. Cl.
CPC .......... *H04B 17/309* (2015.01); *H04W 24/08* (2013.01); *H04W 72/0413* (2013.01)

(58) Field of Classification Search
CPC . H04W 52/146; H04W 52/325; H04W 52/34; H04W 72/0406; H04W 72/0413; H04W 24/08; H04W 52/242; H04B 17/309
See application file for complete search history.

(56) References Cited

U.S. PATENT DOCUMENTS

| | | |
|---|---|---|
| 2010/0246463 A1 | 9/2010 | Papasakellariou et al. |
| 2012/0257513 A1* | 10/2012 | Yamada ................ H04L 1/1861 370/248 |
| 2013/0102345 A1 | 4/2013 | Jung |
| 2014/0192673 A1* | 7/2014 | Li ........................ H04W 52/46 370/252 |
| 2015/0139003 A1* | 5/2015 | Takahashi ............. H04W 24/10 370/252 |
| 2017/0064683 A1 | 3/2017 | Seo et al. |
| 2017/0094610 A1 | 3/2017 | Lee et al. |
| 2018/0332541 A1* | 11/2018 | Liu ..................... H04W 72/042 |
| 2019/0044681 A1* | 2/2019 | Zhang ................. H04B 7/0408 |
| 2019/0349867 A1* | 11/2019 | MolavianJazi ..... H04W 52/242 |

* cited by examiner

*Primary Examiner* — Shukri Taha

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security or safety services.

16 Claims, 12 Drawing Sheets

PUSCH-PowerControl information element

```
-- ASN1START
-- TAG-PUSCH-POWERCONTROL-START

PUSCH-PowerControl ::=            SEQUENCE {
    ...
    ...
    ...
}

PUSCH-PathlossReferenceRS ::=     SEQUENCE {
    pusch-PathlossReferenceRS-Id      PUSCH-PathlossReferenceRS-Id,
    servingCellId                     ServCellIndex            OPTIONAL,
    referenceSignal                   CHOICE {
        ssb-Index                         SSB-Index,
        csi-RS-Index                      NZP-CSI-RS-ResourceId
        srs                               SEQUENCE {
                                              resource    SRS-ResourceId,
                                              uplinkBWP   BWP-Id
                                          }
    }
}
...
...
...
-- TAG-PUSCH-POWERCONTROL-STOP
-- ASN1STOP
```

810 encompasses: servingCellId, referenceSignal, ssb-Index, csi-RS-Index, srs

FIG. 9

900
SRS-ConfigInformation element

```
-- ASN1START
-- TAG-SRS-CONFIG-START

PUSCH-Config ::=                SEQUENCE {
    ...
    ...
    ...
}

SRS-SpatialRelationInfo ::=     SEQUENCE {
    servingCellId                   ServCellIndex           OPTIONAL,
    referenceSignal                 CHOICE {
        ssb-Index                       SSB-Index,
        csi-RS-Index                    NZP-CSI-RS-ResourceId,
        srs                             SEQUENCE {
                                            resource        SRS-ResourceId,
                                            uplinkBWP       BWP-Id
                                        }
    },
    ...
    ...
    ...
}

SRS-ResourceId ::=      INTEGER (0..maxNrofSRS-Resources - 1)

-- TAG-SRS-CONFIG-STOP
-- ASN1STOP
```

910 points to the SRS-SpatialRelationInfo block.

FIG. 10

PUSCH-Config information element 1000

```
— ASN1START
— TAG-PUSCH-CONFIG-START

PUSCH-Config ::=              SEQUENCE {
    ...
    ...
    ...
}

SRS-ResourceSet ::=           SEQUENCE {
    SRS-ResourceSet-Id            SRS-ResourceSet-Id,
    SRS-ResourceIdList            SEQUENCE(SIZE(1..maxNrofSRS-ResourcePerSet)) OF SRS-ResourceId
    ...
    ...
    ...
    servingCellId                 ServCellIndex              OPTIONAL,
    pathlossReferenceRS           CHOICE {
        ssb-Index                     SSB-Index,
        csi-RS-Index                  NZP-CSI-RS-ResourceId
        srs                           SEQUENCE {
                                          resource    SRS-ResourceId,
                                          uplinkBWP   BWP-Id
                                      }
    }
}
...
...
...

— TAG-PUCCH-CONFIG-STOP
— ASN1STOP
```

1010 (pointing to shaded region)

METHOD AND APPARATUS FOR DETERMINING PATHLOSS IN WIRELESS COMMUNICATION SYSTEM

CROSS-REFERENCE TO RELATED APPLICATIONS

This application is based on and claims priority under 35 U.S.C. 119 to Korean Patent Application No. 10-2018-0092857 filed on Aug. 9, 2018 in the Korean Intellectual Property Office, the disclosure of which is herein incorporated by reference in its entirety.

BACKGROUND

1. Field

The disclosure relates to a wireless communication system, and more particularly, to a method and an apparatus for determining a pathloss of a terminal in a wireless communication system.

2. Description of Related Art

The above information is presented as background information only to assist with an understanding of the disclosure. No determination has been made, and no assertion is made, as to whether any of the above might be applicable as prior art with regard to the disclosure.

To meet the demand for wireless data traffic having increased since deployment of Fourth Generation (4 G) communication systems, efforts have been made to develop an improved Fifth Generation (5 G) or pre-5 G communication system. Therefore, the 5 G or pre-5 G communication system is also called a 'Beyond 4 G Network' or a 'Post Long-Term Evolution (LTE) System'. The 5 G communication system is considered to be implemented in higher frequency (mmWave) bands, that is, 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5 G communication systems. In addition, in 5 G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5 G system, Hybrid Frequency-Shift-Keying (FSK) and Frequency Quadrature Amplitude Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5 G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5 G technology and the IoT technology.

Meanwhile, carrier aggregation (CA) technology for combining two or more frequency bands to increase a data rate has been widely known. In the case where a base station and a terminal support only downlink CA, the terminal may receive downlink data and control information through two or more carrier frequencies, but may transmit uplink data and control information through a single carrier frequency. In the case where a base station and a terminal support both downlink CA and uplink CA, the terminal may transmit and receive data and control information through two or more carrier frequencies in the downlink and the uplink.

The information transmitted in the uplink may be included in a physical uplink shared channel (PUSCH), a physical uplink control channel (PUCCH), or a sounding reference signal (SRS), and may then be transmitted. In the case of uplink transmission (that is, when transmitting the PUSCH, the PUCCH, or the SRS mentioned above), the terminal may perform transmission power control in order to mitigate interference with neighbouring cells and increase the reliability of uplink transmission information. In order to control uplink transmission power, the terminal configures a transmission power value using parameters received from the base station and a downlink pathloss value measured by the terminal. If the number of uplink carrier frequencies supporting UL CA increases (that is, if four carrier frequencies are supported), in order to transmit uplink information through four uplink carrier frequencies, the terminal must estimate four downlink pathloss values through downlink reference signals (that is, cell-specific reference signals: CRS), which are transmitted in the downlinks corresponding to respective uplinks. In addition, the terminal must configure transmission power values using the estimated pathloss values when transmitting the uplink information through the four uplink carrier frequencies.

Therefore, as the number of carrier frequencies used in the CA increases, the power consumption of the terminal for estimating the downlink pathloss increases. Such a problem of the power consumption in the terminal may be more serious in a CA environment with a cell using analog beamforming. This is due to the fact that the terminal must measure the beams supported by the cell that the terminal accessed and must report the same to the base station because a downlink beam and an uplink beam, which are transmitted in different directions, exhibit different pathlosses.

Therefore, there is a need for a method for determining pathloss in order to reduce the power consumption of the terminal in such a scenario.

SUMMARY

It is an aspect of the disclosure to provide a method for operating a terminal and a base station in order to determine pathloss in 5 G communication systems and an apparatus thereof. In particular, an aspect of the disclosure is to reduce the power consumption of the terminal by efficiently controlling the operation of the terminal in estimating the downlink pathloss for uplink transmission when applying uplink CA.

In order to solve the above-described problems, a method of a terminal according to an embodiment of the disclosure may include: receiving first information for a pathloss reference linking from a base station; receiving second information for at least one pathloss reference signal (RS) resource from the base station; and transmitting one of a physical uplink shared channel (PUSCH) transmission, a physical uplink control channel (PUCCH) transmission or a sounding reference signal (SRS) transmission on a first serving cell based on a first transmission power, wherein the first transmission power is identified based on a downlink pathloss, the downlink pathloss being calculated using a RS resource on an active downlink bandwidth path (BWP) of a serving cell indicated by the first information, and the RS resource is identified by the second information.

According to another embodiment, wherein, in case that the first information for the pathloss reference linking is not configured, the serving cell is the first serving cell. According to another embodiment, wherein the at least one RS resource comprises a synchronization signal (SS)/physical broadcast channel (PBCH) block, the SS/PBCH block including a primary synchronization signal (PSS), a secondary synchronization signal (SSS), a demodulation reference signal (DMRS) and a physical broadcast channel (PBCH).

According to another embodiment, wherein the at least one RS resource comprises a channel state information reference signal (CSI-RS).

According to another embodiment, wherein, in case that the first information for the pathloss reference linking is not configured, the one of PUSCH transmission, the PUCCH transmission or the SRS transmission is transmitted based on a second transmission power, the second transmission power being identified based on a downlink pathloss which is calculated using a RS resource on an active BWP of the first serving cell.

In order to solve the above-described problems, a terminal according to an embodiment of the disclosure may include: a transceiver configured to transmit and receive signals; and a controller configured to receive first information for a pathloss reference linking from a base station, receive second information for at least one pathloss reference signal (RS) resource from the base station, and transmit one of a physical uplink shared channel (PUSCH) transmission, a physical uplink control channel (PUCCH) transmission or a sounding reference signal (SRS) transmission on a first serving cell based on a first transmission power, wherein the first transmission power is identified based on a downlink pathloss, the downlink pathloss being calculated using a RS resource on an active downlink bandwidth path (BWP) of a serving cell indicated by the first information, and the RS resource is identified by the second information.

In order to solve the above-described problems, a method of a base station according to an embodiment of the disclosure may include: transmitting first information for a pathloss reference linking to a terminal; transmitting second information for at least one pathloss reference signal (RS) resource to the terminal; and receiving one of a physical uplink shared channel (PUSCH) transmission, a physical uplink control channel (PUCCH) transmission or a sounding reference signal (SRS) transmission on a first serving cell based on a first transmission power, wherein the first transmission power is identified based on a downlink pathloss, the downlink pathloss being calculated using a RS resource on an active downlink bandwidth path (BWP) of a serving cell indicated by the first information, and the RS resource is identified by the second information.

In order to solve the above-described problems, a base station according to an embodiment of the disclosure may include: a transceiver configured to transmit and receive signals; and a controller configured to transmit first information for a pathloss reference linking to a terminal, transmit second information for at least one pathloss reference signal (RS) resource to the terminal, and receive one of a physical uplink shared channel (PUSCH) transmission, a physical uplink control channel (PUCCH) transmission or a sounding reference signal (SRS) transmission on a first serving cell based on a first transmission power, wherein the first transmission power is identified based on a downlink pathloss, the downlink pathloss being calculated using a RS resource on an active downlink bandwidth path (BWP) of a serving cell indicated by the first information, and the RS resource is identified by the second information.

By means of a method of determining pathloss according to embodiments of the disclosure, it is possible to reduce the power consumption of the terminal for estimating pathloss, and the base station does not need to transmit a reference signal for the terminal to estimate pathloss, thereby increasing the flexibility of the base station scheduling.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates a diagram illustrating another example of a method of transmitting pathloss linking information;

FIG. 9 illustrates a diagram illustrating another example of a method of transmitting pathloss linking information;

FIG. 10 illustrates a diagram illustrating another example of a method of transmitting pathloss linking information;

DETAILED DESCRIPTION

Figure 1:
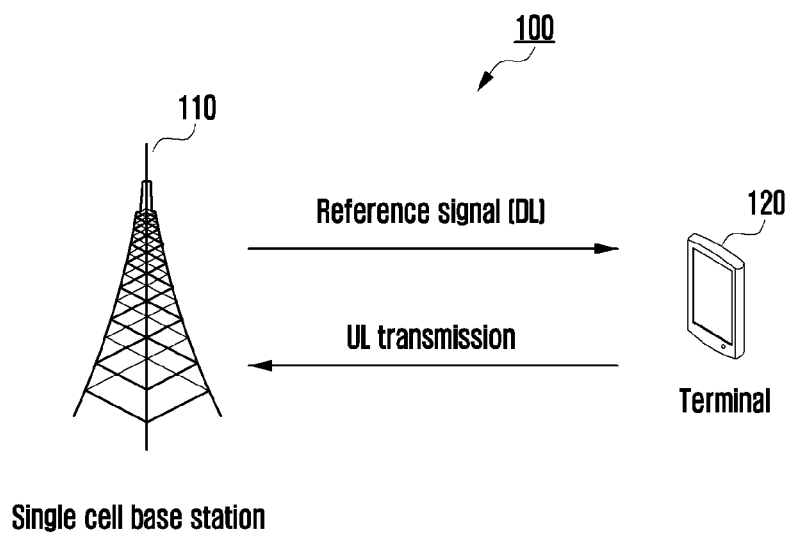
FIG. 1 illustrates a diagram illustrating the operation of a base station and a terminal in a single cell in which carrier aggregation (CA) is not used in a communication system.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure will be described in detail with reference to the accompanying drawings. Here, it is noted that identical reference numerals denote the same structural elements in the accompanying drawings. Further, a detailed description of a known function and configuration which may make the subject matter of the disclosure unclear will be omitted.

In describing the embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

FIG. 1 illustrates a diagram illustrating the operation 100 of a base station 110 and a terminal 120 in a single cell in which carrier aggregation (CA) is not used in a communication system. The base station transmits a reference signal (RS) through a downlink (DL), and the terminal measures the same, thereby estimating a downlink pathloss (PL) value. The terminal uses the estimated pathloss value for transmission power control in uplink (UL) transmission. More specifically, the base station transmits a cell-specific reference signal (CRS) to the terminal through the downlink and informs the terminal of a transmission power value of the CRS (referenceSignalPower) through system information. The terminal measures a reference signal-received power (RSRP) using the CRS transmitted by the base station and estimates a pathloss value using the transmission power value of the CRS transmitted by the base station through the system information. In addition, the terminal uses the downlink pathloss value estimated by the terminal in configuring transmission power values of an uplink data channel {that is, a physical uplink shared channel (PUSCH)}, an uplink control channel {that is, a physical uplink control channel (PUCCH)}, and an uplink sounding reference signal (SRS).

Figure 2:
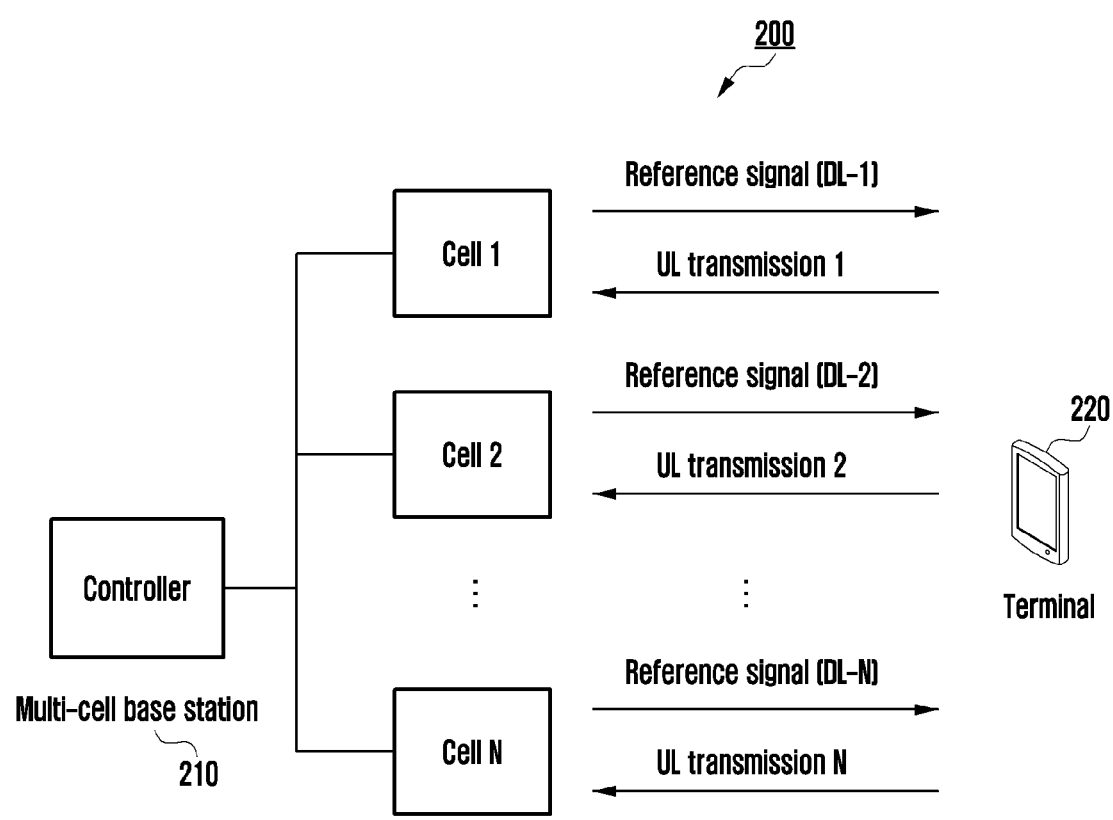
FIG. 2 illustrates a diagram illustrating the operation of a base station and a terminal in an environment in which downlink (DL)/uplink (UL) CA is used in a communication system.

FIG. 2 illustrates a diagram illustrating the operation 200 of a base station 210 and a terminal 220 in an environment in which DL CA and UL CA are used in a communication system. In this case, the number of carrier frequencies used in the UL CA may be a subset of the number of carrier frequencies used in the DL CA. That is, assuming that the number of carriers used in the DL CA is M and that the number of carriers used in the UL CA is N, M=N. In this case, the carrier used in the DL CA or the UL CA may be referred to as a "cell". In the case of DL CA in which the base station supports two or more cells, the base station may transmit the CRS through the downlink of each cell. The terminal may measure the downlink RSRP of each cell using the CRS transmitted from the base station. In addition, the base station may configure, to the terminal, a transmission power value (referenceSignalPower) of the CRS transmitted in each cell through system information. The terminal may estimate a pathloss value of each cell using the downlink RSRP measured through the CRS of each cell and the CRS transmission power value of each cell received from the base station. When transmitting a data channel, a control channel, and a sounding reference signal through the uplink of a specific cell, the terminal may perform transmission power control using the pathloss value estimated through the downlink of the corresponding cell. However, in order to support this operation, the terminal must measure the CRSs that are transmitted in all the cells, which may increase the power consumption of the terminal.

Figure 3:
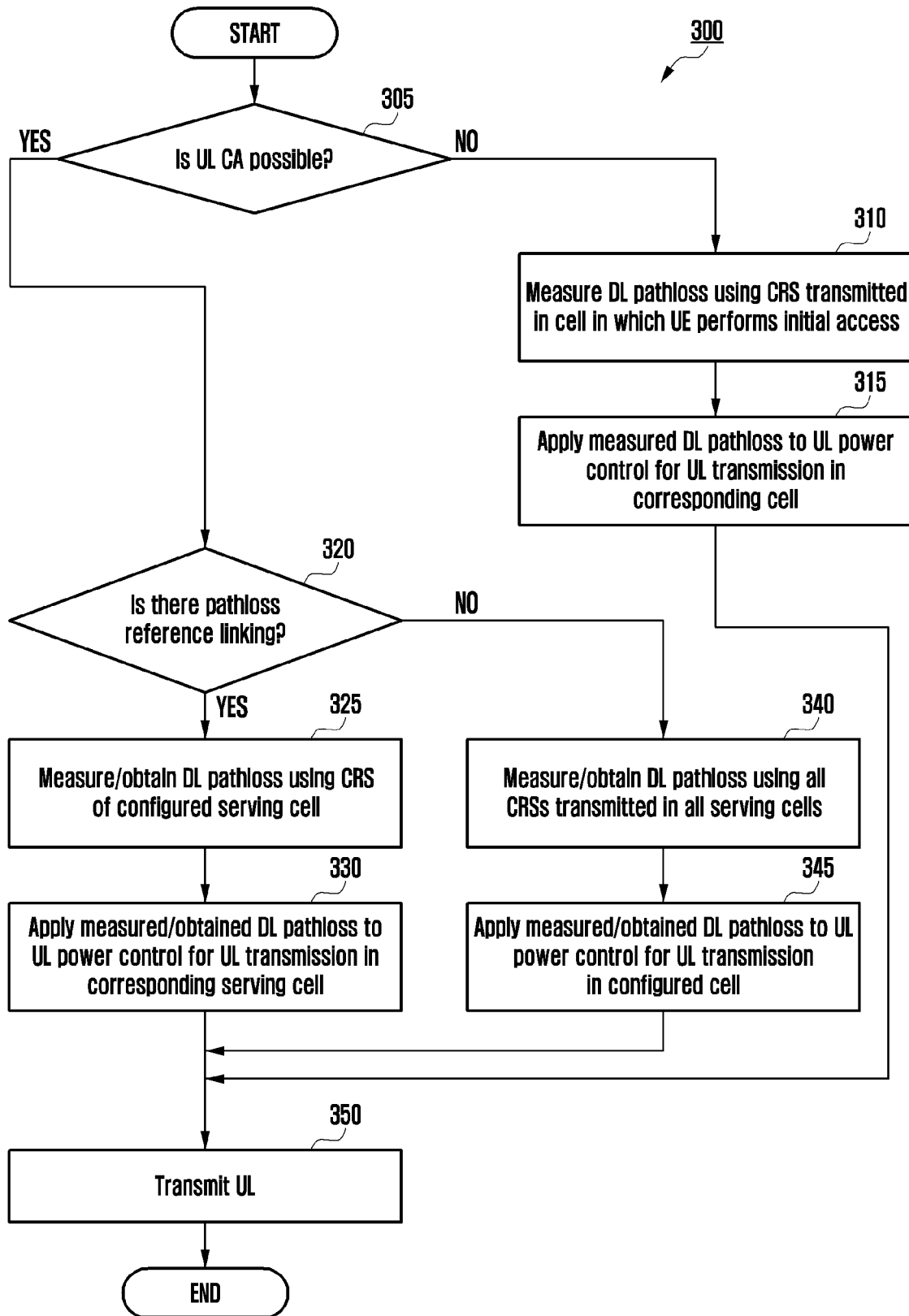
FIG. 3 illustrates a process illustrating the operations of a base station and a terminal in an environment in which DL/UL CA is used in a communication system.

In order to solve this problem, the operations of a process 300 of a terminal illustrated in FIG. 3 has been taken into consideration in the conventional CA technology. FIG. 3 illustrates a process illustrating the operations of a base station and a terminal in an environment using DL/UL CA in a communication system. A terminal that supports DL CA rather than UL CA or a terminal that supports neither DL CA nor UL CA perform uplink transmission (an uplink data channel, a control channel, and a sounding reference signal) in the UL cell that the terminal accessed. In this case, the UL cell that the terminal accessed denotes the UL cell in which the terminal performs an initial random access procedure before establishment of a radio resource control (RRC) connection, and in the case where UL CA is not supported, the DL cell in which the terminal performs downlink synchronization with the base station may be the same as the UL cell in which the terminal performs an initial random access procedure. Accordingly, the terminal that does not support UL CA (No in 305) may estimate a downlink pathloss value using the CRS received from the DL cell in which the terminal performs downlink synchronization with the base station (310). In addition, the terminal applies the estimated pathloss value to the configuration of transmission power values for all uplink transmissions at carrier frequencies of the UL cell (315).

Meanwhile, a terminal supporting both DL CA and UL CA may support the transmission/reception of data and control information through two or more cells in the downlink (or two or more different downlink carrier frequencies) and two or more cells in the uplink (or two or more different uplink carrier frequencies). The uplink transmission (the uplink data channel and the control channel) performed before the establishment of an RRC connection may be performed in the UL cell (or at the uplink carrier frequency) corresponding to the DL cell (or the downlink carrier frequency) in which the terminal performs downlink synchronization with the base station. In this case, the UL cell (or the uplink carrier frequency) corresponding to the DL cell (or the downlink carrier frequency) may be configured by the base station through system information.

In the process of establishing an RRC connection, the base station and the terminal negotiate whether or not to support DL CA and UL CA. With this capability negotiation, the base station may recognize whether or not the terminal supports CA (that is, whether the terminal supports both DL CA and UL CA, supports only DL CA, or supports neither DL CA nor UL CA), and the terminal may recognize whether or not the base station supports CA. The expression "supporting UL CA" may mean that both DL CA and UL CA are supported in this specification. In addition, the expression "UL CA is not supported" may mean that only DL CA is supported, instead of supporting UL CA, or may mean that neither UL CA not DL CA is supported.

The terminal supporting UL CA (Yes in 305) may obtain information about UL cells (that is, a UL cell index or a DL cell index corresponding to the UL cell index) for the UL-CA operation and information about reference linking or linking of the pathloss from the base station through RRC configuration (320). The information about linking of the pathloss may include a cell index capable of referring to a downlink pathloss value of a corresponding cell used for the configuration of a transmission power value necessary for the uplink transmission of the corresponding cell (the transmission of an uplink data channel, an uplink control channel, and an uplink sounding reference signal).

More specifically, the base station may configure a UL cell index for the UL-CA operation or a DL cell index corresponding to the UL cell index as shown in the following example. The base station may configure "ServingCellIndex=1, 2", which means that the UL transmission may be performed through cell indexes 1 and 2. In this case, if pathloss linking is set to "0" in each serving cell, the terminal may estimate a pathloss value through the CRS transmitted in DL ServingCellIndex corresponding to UL ServingCellIndex 0 or DL ServingCellIndex 0, instead of estimating a downlink pathloss value through the CRS transmitted in ServingCellIndex 1 and ServingCellIndex 2 (that is, transmitted in DL ServingCellIndex corresponding to UL ServingCellIndex 1 and DL ServingCellIndex corresponding to UL ServingCellIndex 2, or transmitted in DL ServingCellIndex 1 and DL ServingCellIndex 2) (325). The terminal may apply the estimated pathloss value to the configuration of a transmission power value of the uplink data channel, the uplink control channel, or the uplink sounding reference signal transmitted in ServingCellIndex 1 and ServingCellIndex 2 (that is, transmitted in UL ServingCellIndex corresponding to DL ServingCellIndex 1 and UL ServingCellIndex corresponding to DL ServingCellIndex 2, or transmitted in UL ServingCellIndex 1 and UL ServingCellIndex 2) (330). The terminal may transmit, to the base station, an uplink data channel, an uplink control channel, or an uplink sounding reference signal using the configured transmission power value (350).

Even if the terminal supports UL CA, if the base station does not configure the pathloss linking (No in 320), the terminal may estimate a downlink pathloss value using the CRSs of all the cells configured by the base station for CA (340). The terminal may apply the estimated downlink pathloss value to the configuration of a transmission power value of the uplink transmission through the UL cell activated by the base station (345). In addition, the terminal may perform the uplink transmission using the configured transmission power value (350).

Figure 4:
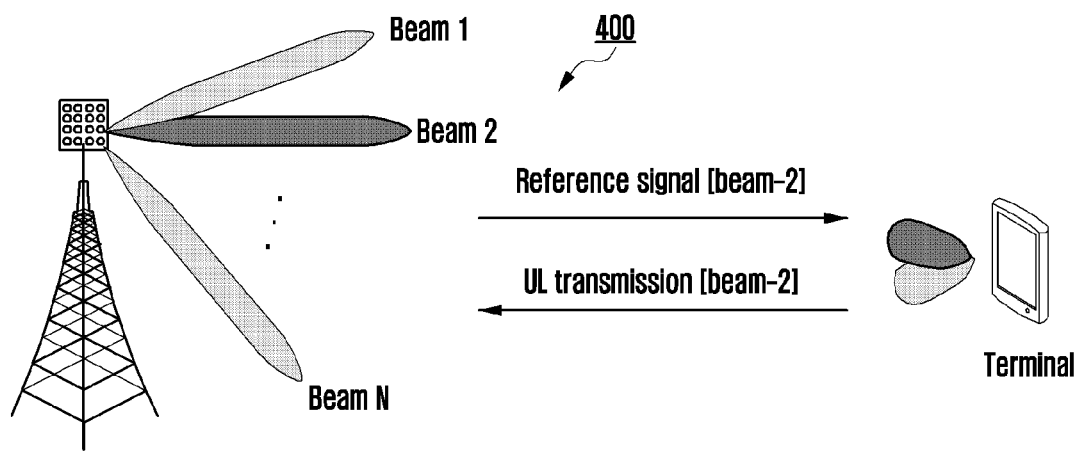
FIG. 4 illustrates a diagram illustrating the operation of a base station and a terminal in a system including a single cell using two or more beams.

FIG. 4 illustrates a diagram illustrating the operation 400 of a base station and a terminal in a system including a single cell using two or more beams. More specifically, FIG. 4 shows an example of a cell supporting N beams (beam-1, beam-2, . . . , and beam-N) in which the terminal measures RSRP values for M beams through the reference signals transmitted from the base station (N=M) and performs uplink transmission in the direction of beam-2. In this case, the direction of beam-2 used for the uplink transmission of the terminal may be determined by the terminal, or indicated by the instruction of the base station.

As an example in which the terminal determines the uplink transmission in the direction of beam-2, the terminal may perform the uplink transmission in the direction of a beam having the largest RSRP value (that is, beam-2 in FIG. 4), among the M RSRP values measured by the terminal. In the case where the base station indicates the uplink beam direction, the base station may instruct the terminal to perform the uplink transmission in a specific beam direction using RRC, medium access control (MAC) control element (CE), downlink control information (DCI), or a combination thereof (that is, a combination of RRC and DCI). In this case, the beam direction may be a resource index of a downlink RS used for the downlink RSRP measurement and the downlink pathloss estimation therethrough (for example, the case where there is beam correspondence or beam reciprocity between the downlink and the uplink), or may be a resource index of the SRS used for the uplink transmission of a sounding reference signal (for example, the case where there is no beam correspondence or beam reciprocity between the downlink and the uplink). More specifically, the RS available for the downlink RSRP measurement and the downlink pathloss estimation may be a synchronization signal block (SSB) {only secondary synchronization signal (SSS) of the SSB is used or both the SSS of the SSB and a demodulation RS (DMRS) of a physical broadcast channel (PBCH) are used} or a channel state information (CSI)-RS. In the case where the base station indicates the uplink beam direction, the base station may inform the terminal of the SSB, the CSI-RS, or the resource index of the SRS through RRC, MAC CE, DCI, or a combination thereof.

Figure 5:
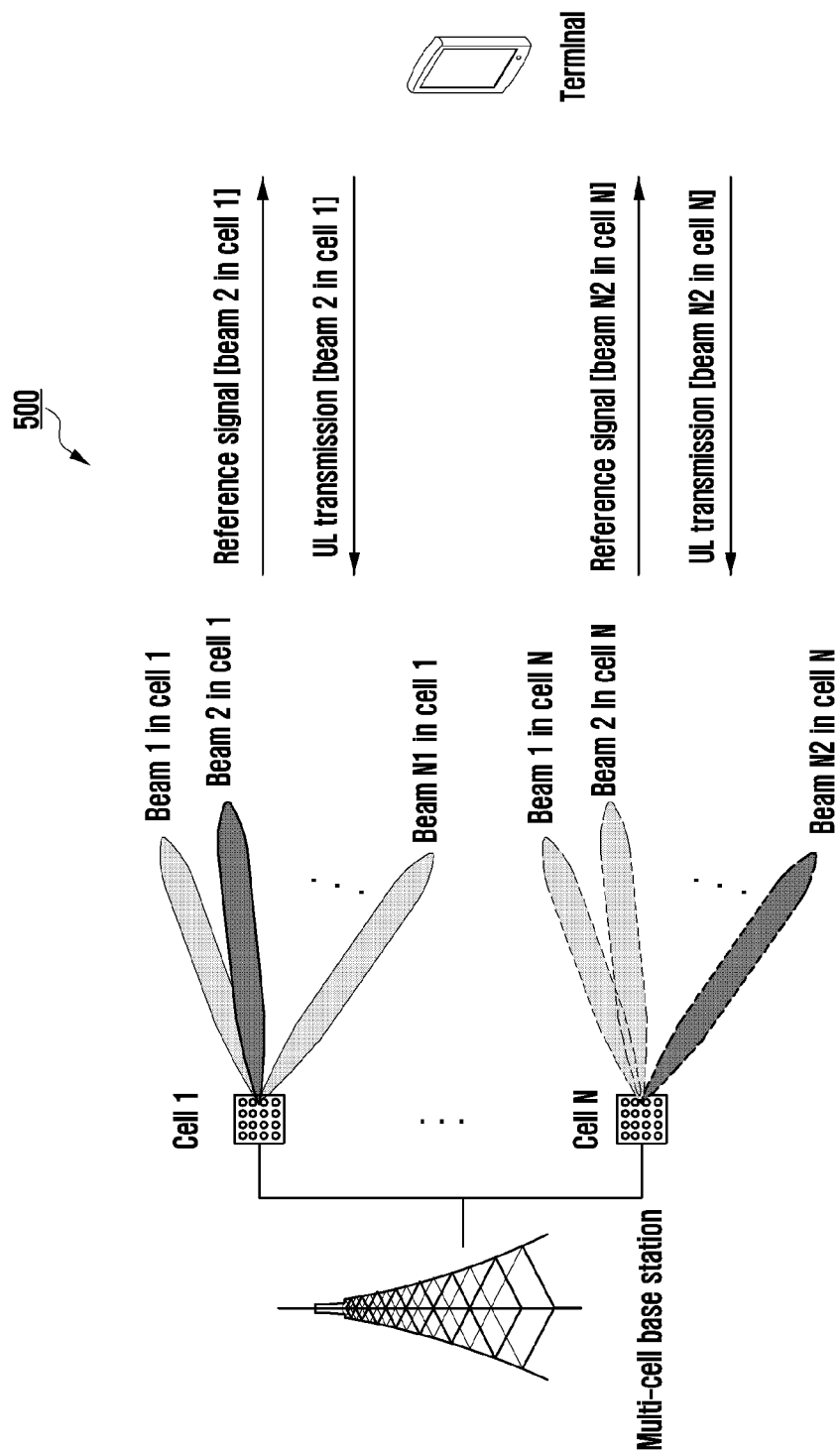
FIG. 5 illustrates a diagram illustrating the operation of a base station and a terminal in a CA environment including multiple cells using two or more beams.

FIG. 5 illustrates a diagram illustrating the operation 500 of a base station and a terminal in a CA environment including multiple cells using two or more beams. More specifically, FIG. 5 shows an example of cell-1 supporting N1 beams and cell-N supporting N2 beams, in which terminal may measure RSRP values for M1 beams from cell-1 (N1=M1), may perform the uplink transmission of cell-1 in the direction of beam-2, may measure RSRP values for M2 beams from cell-N(N2=M2), and may perform uplink transmission of cell-N in the direction of beam-N2. Although FIG. 5 illustrates an example in which all of the cells use two or more beams, the embodiment may include the case where a specific cell or specific cells of the base station constituting multiple cells use a single beam. In the conventional CA, the RSRP is measured using the CRS transmitted in each cell as described in FIG. 2, or the pathloss value estimated in a specific cell configured by the base station may be used in the configuration of the uplink transmission power value as described in FIG. 3. However, in a communication system using a multi-beam, even in a single cell, the RSRP values may be measured using two or more RS s and the pathloss value may be estimated using the RSRP to then be used in the configuration of the uplink transmission power value, as described in FIG. 4. Therefore, the power consumption of the terminal may be increased, compared to the system using a single beam. This problem may be more serious when performing the CA operation in a system including multiple cells using multiple beams.

Meanwhile, systems using analog beamforming may operate in the mmWave frequency band, and may perform broadband transmission (that is, 1 GHz bandwidth). In such a scenario, a technique for supporting the operation of bandwidth part (BWP) has been discussed in order to reduce power consumption of the terminal. More specifically, even in the case of a terminal or a base station supporting 1 GHz bandwidth, if transmission/reception of data and control information is performed through a full bandwidth every time, power consumption of the terminal may be increased. In addition, there may be a terminal that supports a broad bandwidth and a terminal that supports a narrow bandwidth according to the capability of the terminal. A bandwidth part may be operated for these terminal and base station. That is, if the base station supports a broad bandwidth, but if the terminal has no capability to support the broad bandwidth, based on the capability of the terminal, the base station may transmit data and control information of the downlink to the terminal through a narrow bandwidth (or bandwidth part), thereby instructing the terminal to transmit data and control information in the uplink.

The base station may configure up to four bandwidth parts (BWPs) within the system bandwidth through UE-specific RRC signaling, and may indicate bandwidth parts for performing reception of downlink data and control information or transmission of uplink data and control information to the terminal through DCI (one of the four bandwidth parts indicated through the RRC is specified through DCI). Alternatively, the base station may specify, through RRC reconfiguration, a bandwidth part for the terminal to receive downlink data and control information or to transmit uplink data and control information. The bandwidth part capable of performing the reception of the downlink data and the control information or the transmission of the uplink data and control information, which are actually specified through the DCI or RRC reconfiguration from the base station, may be referred to as an "active bandwidth part (BWP)".

Figure 6:
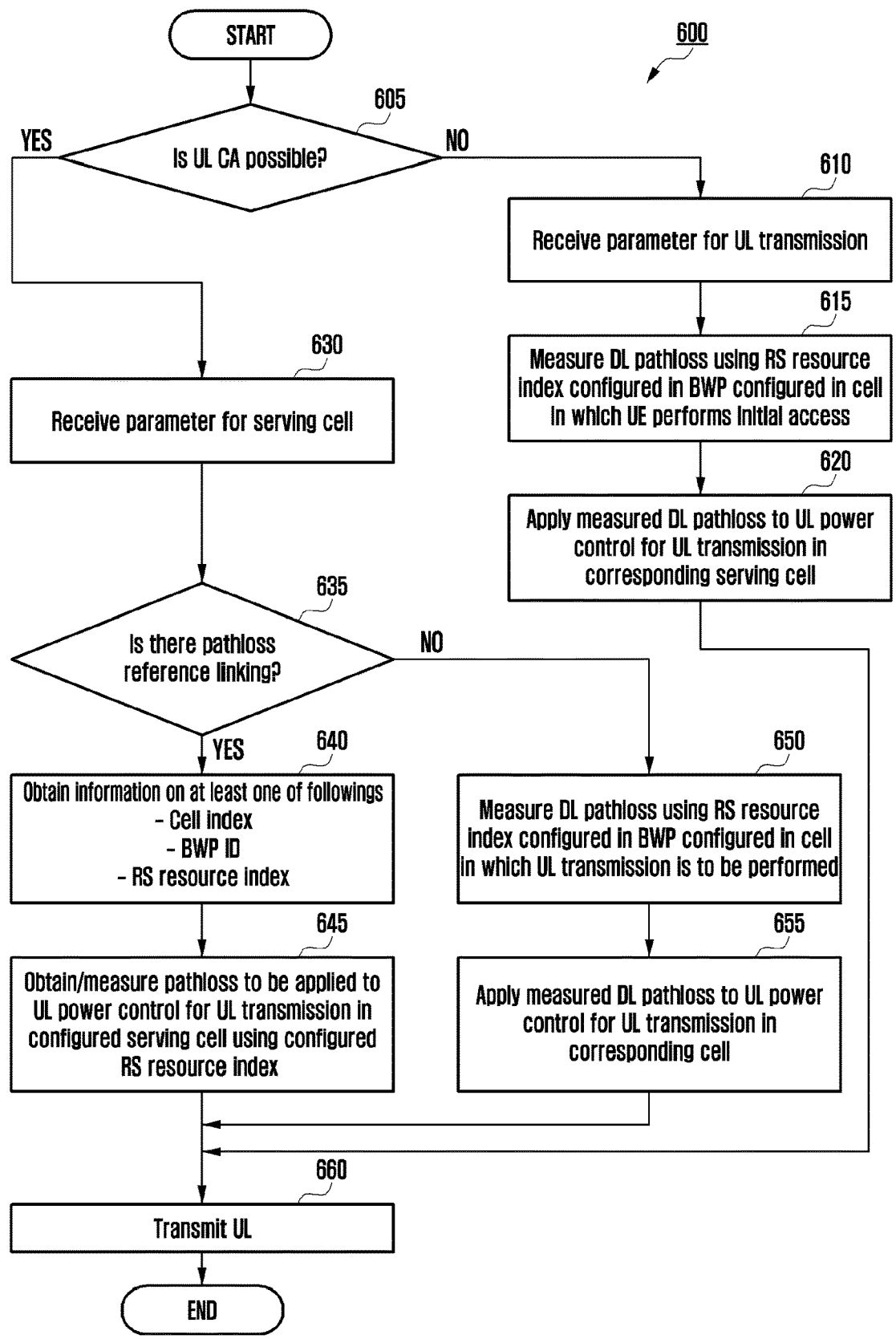
FIG. 6 illustrates a process illustrating the operations for solving a power consumption problem of a terminal in the case of performing a CA operation in a system including multiple cells using multiple beams.

FIG. 6 illustrates a process illustrating the operations for solving a power consumption problem of a terminal in the case of performing a CA operation in a system including multiple cells using multiple beams.

In the process of establishing an RRC connection, the base station and the terminal may negotiate whether or not to support UL CA (605). If the base station that the terminal accessed supports UL CA, and if the terminal also supports UL CA, then the base station may configure parameters required for the CA operation to the terminal through the RRC (630). In this case, the parameters may include serving cell indexes used for the CA and parameters used in the downlink and uplink transmission of the respective serving cells.

The parameters used in the uplink transmission of the respective serving cells may include at least one of the following parameters.

Time division duplex (TDD) DL/UL configuration. That is, the configuration of a DL slot and a UL slot in a TDD system.

UL bandwidth part (BWP)-related parameters. That is, the numbers of BWPs supported by the serving cell and the parameters for transmitting a PUSCH, a PUCCH, or an SRS in the respective BWPs.

Parameters used in the PUSCH transmission may include one or more of the following parameters.

\*\*An ID for PUSCH scrambling, information on whether the PUSCH follows codebook-based transmission or non-codebook based transmission, a mapping type of the PUSCH DMRS, a PUSCH power control parameter, a PUSCH frequency hopping mode, a PUSCH resource allocation type, the number of slots to be aggregated in case of the PUSCH, a modulation and coding scheme (MCS) table used in the PUSCH {that is, 64-QAM (quadrature amplitude modulation) or 256-QAM}, a waveform used in the PUSCH transmission {that is, cyclic prefix-based orthogonal frequency division multiplexing (CP-OFDM) or discrete Fourier transform spread OFDM (DFT-S-OFDM)} used in the PUSCH transmission, the maximum number of ranks of the PUSCH, the size of a resource block group (RBG), information on whether or not to apply pi/2 binary phase shift keying (BPSK), parameters for transmitting uplink control information (UCI) through the PUSCH, and the like.

\*\*Information on whether a transport block (TB) is transmitted in units of a code block group (CBG) or a TB through the PUSCH, the maximum number of CBGs for each TB in the case where the TB is transmitted in units of a CBG, and the like.

PUCCH transmission parameters may include one or more of the following parameters.

\*number of PUCCH resource sets, respective PUCCH format-related parameters {parameters related to PUCCH format 1, format 2, format 3, and format 4, which include information on whether or not to support frequency hopping in the slot for each PUCCH format, information on whether or not to use additional DMRSs, a maximum supported code rate, information on whether or not to support multiplexing of hybrid automatic repeat request (HARQ)-ACK and CSI information, and the like}, timing from the reception of DL to the transmission of ACK, a PUCCH power control parameter, beam information used in the PUCCH transmission, and the like.

SRS transmission parameters may include one or more of the following parameters.

\*number of SRS resource sets, information on whether or not accumulation is used in transmission power control (TPC), the number of SRS resources and the type of SRS resource (that is, an aperiodic, periodic, or semi-persistent SRS) in each SRS resource set, an SRS transmission power control parameter used in the SRS transmission, and the like.

BWP for initial UL transmission in a special cell (SpCell: a primary cell in a master cell group or a primary secondary cell in a secondary cell group).

TAG ID: An ID of TAG used in the secondary cell (a group to which the same timing advance may be applied)

PUSCH transmission parameters: enable CBG-based transmission and include max CBG per TB (2, 4, 6, and 8).

The base station may include parameters indicating linking of the downlink pathloss, as well as the above parameters, in the parameters for a serving cell, and may transmit the same to the terminal (635 and 640). In this case, the parameters indicating the linking of the pathloss may include an index of the cell, which must be referred to in order to apply the pathloss. In addition, in FIG. 6, the parameters indicating the pathloss linking may include an index of a cell in which a downlink pathloss value can be referred to (hereinafter, referred to as a "reference cell") and an ID of a BWP supported by the reference cell (for example, in the case where the reference cell operates a BWP). In this case, the BWP ID may be an index of the bandwidth part. More specifically, if a system operates four bandwidth parts, the BWP ID may have a value of 1, 2, 3, or 4 (or may have a value of 0, 1, 2, or 3). As another example, the parameters indicating the pathloss linking may include an index of a reference cell and a BWP ID of a cell to which the pathloss value is to be applied (hereinafter, referred to as a "target cell"). In another embodiment, the parameters indicating the pathloss linking may include an index of a reference cell, a BWP ID of a reference cell, and a BWP ID of a target cell.

Meanwhile, the terminal that has obtained information on the index of a reference cell and the BWP ID of a reference cell or a target cell from the parameters indicating the pathloss linking (in the case where there is no BWP ID, the terminal that has obtained only the index of a reference cell) may further obtain information about an RS resource index. In this case, the RS resource index may denote the type of an RS (that is, the DMRS or the CSI-RS of the SSS/PBCH) transmitted in the BWP indicated by the BWP ID of the reference cell and an index of a resource transmitted by the corresponding RS in the cell indicated by the index of the reference cell. As another example, the RS resource index may denote an index of an SRS resource transmitted in the BWP indicated by the BWP ID of a target cell in the cell indicated by the index of the reference cell.

The terminal that has obtained information on at least one of the index of a reference cell, the BWP ID of a reference cell or the RS resource index transmitted in the BWP of a reference cell may estimate/measure/calculate the downlink pathloss according to information received in the process of determining the UL transmission power for uplink transmission in a serving cell and according to the RS resource index in the BWP of the reference cell (645). A more detailed example will be described. The example will be described on the assumption that the terminal transmits a PUSCH through the UL in cell index "1" and that the pathloss linking parameters received by the terminal from the base station through RRC include the reference cell index="0", the BWP ID of the reference cell="3", and the SSB resource index="8". In this case, the terminal may obtain the downlink pathloss value necessary for the transmission power value of the PUSCH transmitted in cell index "1" through SSB resource index "8" transmitted in BWP ID "3" of cell "0", instead of estimating the downlink pathloss value through the downlink of cell index "1", and may use the same for the configuration of a PUSCH transmission power value. Another example will be described on the assumption that the terminal transmits a PUSCH through the UL in cell index "1" and that the pathloss linking parameters received by the terminal from the base station through RRC include the reference cell index="0", the BWP ID of the target cell="3", and the SRS resource index="6". In this case, the terminal may use the downlink pathloss value, which was used for transmitting SRS resource index "6" in BWP ID "3" of cell "0", for the configuration of PUSCH transmission power value, instead of estimating the downlink pathloss value necessary for the transmission power value of the PUSCH transmitted in cell index "1" through the downlink of cell index "1". Then, the terminal may perform uplink transmission using the configured transmission power value (660).

Although the transmission of the PUSCH has been described in the above examples, the pathloss linking parameters may also be applied to the transmission of a PUCCH or an SRS. As another example, the parameters indicating the linking of the pathloss may be applied only to the transmission of one of the PUSCH, PUCCH, or SRS. In this case, the PUSCH, PUCCH, or SRS to which the parameters indicating the linking of the pathloss are applied may be determined according to a predetermined rule, or may be determined by the base station. As an example of the predetermined rule, if the parameters indicating the pathloss linking is configured by the base station, and if the parameters indicating the pathloss linking includes at least one of an index of a reference cell, a BWP ID of a target cell (or a BWP ID of a reference cell), the type of RS, or an indexes of resources in which the RS is transmitted, the base station and the terminal may be aware that the corresponding pathloss value is to be used only in the PUSCH transmission, and may operate according thereto. On the other hand, as an example in which the base station determines the PUSCH, PUCCH, or SRS to which the parameters indicating the pathloss linking are applied, the base station may inform the terminal of whether to apply the pathloss value obtained from the pathloss linking parameters to the PUSCH, the PUCCH, or the SRS through 2 bits.

If the base station does not support UL CA or if the terminal does not support UL CA (605), the terminal may use a pathloss value estimated, using the type of RS specified by the base station and the downlink RS transmitted in the RS resource index, for the configuration of the transmission power value in the uplink transmission in a downlink BWP, which is activated by the base station, in the cell in which the terminal performs an initial random access with respect to the base station (610, 615, and 620). As another example, the terminal may use the downlink pathloss value used in the transmission of the SRS, which is transmitted through the SRS resource index specified by the base station, for the configuration of a transmission power value of the uplink in the uplink BWP activated by the base station in the cell in which the terminal performs an initial random access with respect to the base station. Then, the terminal may perform uplink transmission using the configured transmission power value (660).

Meanwhile, if both the base station and the terminal support UL CA, but if the CA-related parameters transmitted from the base station to the terminal do not include the pathloss linking parameters (No in 635), the terminal may estimate a pathloss value using a downlink RS transmitted in the active downlink BWP of the DL cell corresponding to the UL cell in which the UL transmission is actually performed (650). In this case, the base station may configure the BWP ID and the RS resource indexes of the DL cell to the terminal. The terminal may use the estimated downlink pathloss value in setting the transmission power value of the uplink transmission (655). As another example, the terminal may use the downlink pathloss value used in the transmission of the SRS transmitted in the active uplink BWP of the UL cell in which the UL transmission is actually to be performed. In this case, the base station may configure the BWP ID and the SRS resource indexes of the UL cell to the terminal. Then, the terminal may perform uplink transmission using the configured transmission power value (660).

Figure 7:
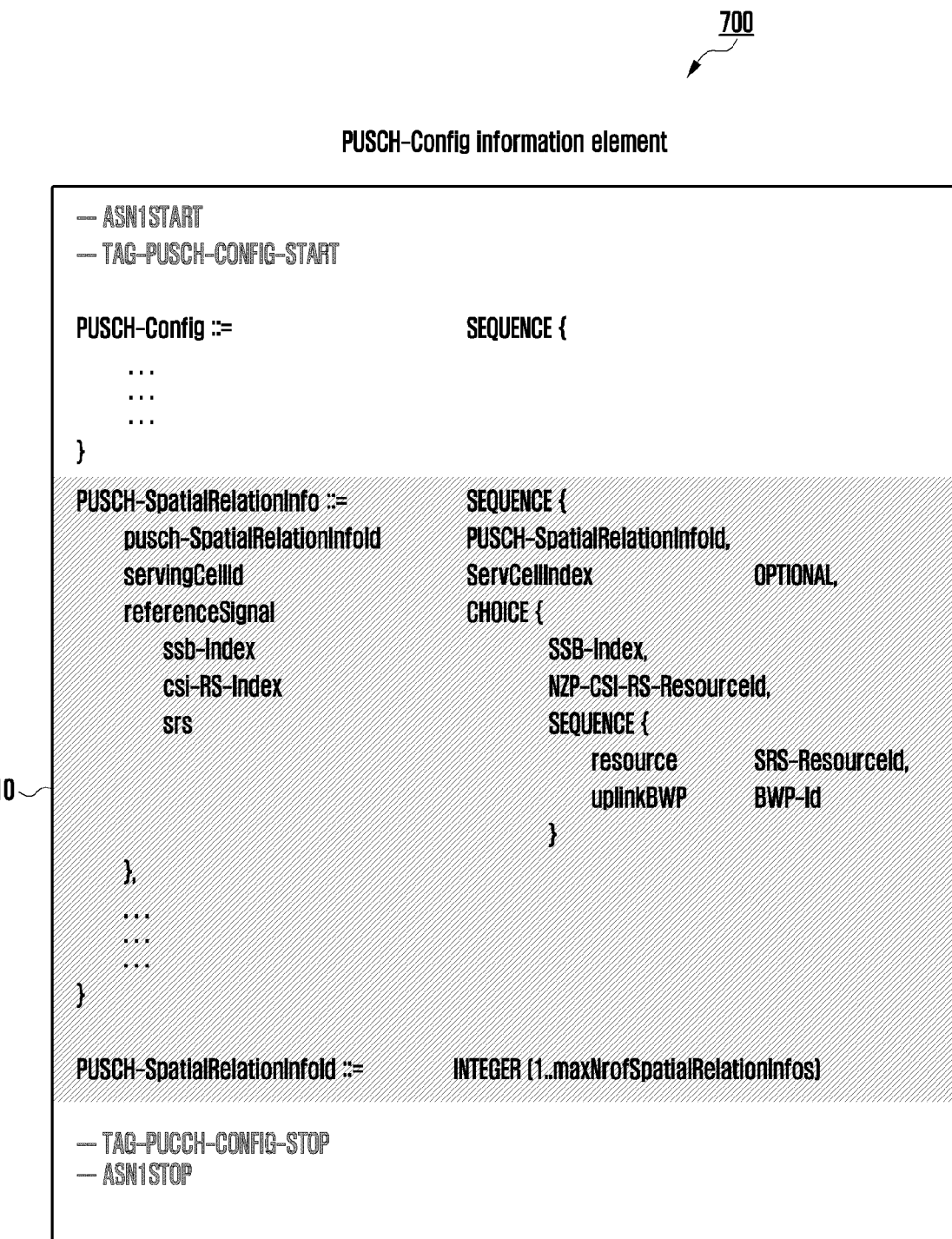
FIG. 7 illustrates a diagram illustrating an example of a method of transmitting pathloss linking information.

FIG. 7 illustrates a diagram illustrating an example of a method of transmitting pathloss linking information. As another example of the pathloss linking, the base station may include linking information 710 of pathloss in an RRC parameter "PUSCH-SpatialRelationInfo" 700, and PUSCH-SpatialRelationInfo may be configured to the terminal via PUSCH-Config information element (IE). In this case, PUSCH-SpatialRelationInfo may be configured as shown in FIG. 7, and the parameters related to the linking information of pathloss are as follows.

As used herein, "PUSCH-SpatialRelationInfoId" is an index representing the beam direction for PUSCH transmission. The maximum number of beam directions (maxNrof-PUSCH-SpatialRelationInfos), which may be supported for PUSCH transmission in the cell, is fixed (that is, 32), and PUSCH-SpatialRelationInfoId may be indexed within the maximum number. For example, assuming maxNrof-PUSCH-SpatialRelationInfos=32, PUSCH-SpatialRelation-InfoId may have a value between [1, 32].

As used herein, "servingCellId" is an index of the cell in which the downlink pathloss value can be referred to. In this case, the index of the cell may be the same as or different from the index of the cell in which the terminal transmits the PUSCH. If servingCellId is the same as the index of the cell for transmitting the PUSCH, the terminal may estimate a pathloss value using a downlink RS (the SSB or the CSI-RS) transmitted through the downlink cell index corresponding to the index of the corresponding cell. As another example of the case where the servingCellId is the same as the index of the cell for transmitting the PUSCH, the terminal may reuse the pathloss value applied to the SRS, which is transmitted (or which has been transmitted) through the index of the corresponding cell, in the PUSCH transmission. Meanwhile, if servingCellId is different from the index of the cell for transmitting the PUSCH, the terminal may estimate a pathloss value using the downlink RS transmitted through the downlink cell index corresponding to the index of the cell indicated by servingCellId, instead of the cell for transmitting the PUSCH. As another example of the case where servingCellId is different from the index of the cell for transmitting the PUSCH, the terminal may reuse the pathloss value applied to the SRS, which is transmitted (or which has been transmitted) through the index of the cell, in the PUSCH transmission.

As used herein, "ReferenceSignal" denotes the type of RS from which the pathloss value can be obtained and the index of the RS resource. More specifically, this parameter indicates whether the type of the RS from which the pathloss value can be obtained is the SSB, the CSI-RS, or the SRS. In addition, the parameter denotes an index of a resource in which the SSB is transmitted in case of the SSB, denotes an index of a resource in which the CSI-RS is transmitted in the case of the CSI-RS, and denotes an index of a resource in which the SRS is transmitted in case of the SRS. Meanwhile, if the RS from which the pathloss value can be obtained is the SRS, the parameter may include the ID of the BWP in which the SRS is transmitted, as well as the SRS resource index (SRS-ResourceId).

FIG. 8 illustrates a diagram illustrating another example of a method of transmitting pathloss linking information. As another example of pathloss linking, the base station may include linking information 810 of pathloss in an RRC parameter "PUSCH-PathlossReferenceRS" 800, and PUSCH-PathlossReferenceRS may be configured to the terminal via PUSCH-PowerControl information element (IE). In this case, PUSCH-PathlossReferenceRS may be configured as shown in FIG. 8, and the parameters related to the linking information of pathloss are as follows.

As used herein, "PUSCH-PathlossReferenceRS-Id" is an index representing the beam direction for PUSCH transmission. The maximum number of beam directions (maxNrof-PUSCH-SpatialRelationInfos), which may be supported for PUSCH transmission in the cell, is fixed (that is, 32), and PUSCH-SpatialRelationInfoId may be indexed within the maximum number. For example, assuming maxNrof-PUSCH-SpatialRelationInfos=32, PUSCH-SpatialRelation-InfoId may have a value between [1, 32].

As used herein, "servingCellId" is an index of the cell in which the downlink pathloss value can be referred to. In this case, the index of the cell may be the same as or different from the index of the cell in which the terminal transmits the PUSCH. If servingCellId is the same as the index of the cell for transmitting the PUSCH, the terminal may estimate a pathloss value using a downlink RS (the SSB or the CSI-RS) transmitted through the downlink cell index corresponding to the index of the corresponding cell. As another example of the case where the servingCellId is the same as the index of the cell for transmitting the PUSCH, the terminal may reuse the pathloss value applied to the SRS, which is transmitted (or which has been transmitted) through the index of the corresponding cell, in the PUSCH transmission. Meanwhile, if servingCellId is different from the index of the cell for transmitting the PUSCH, the terminal may estimate a pathloss value using the downlink RS transmitted through the downlink cell index corresponding to the index of the cell indicated by servingCellId, instead of the cell for transmitting the PUSCH. As another example of the case where servingCellId is different from the index of the cell for transmitting the PUSCH, the terminal may reuse the pathloss value applied to the SRS, which is transmitted (or which has been transmitted) through the index of the cell, in the PUSCH transmission.

referenceSignal: This denotes the type of RS from which the pathloss value can be obtained and the index of the RS resource. More specifically, this parameter indicates whether the type of the RS from which the pathloss value can be obtained is the SSB, the CSI-RS, or the SRS. In addition, the parameter denotes an index of a resource in which the SSB is transmitted in case of the SSB, denotes an index of a resource in which the CSI-RS is transmitted in the case of the CSI-RS, and denotes an index of a resource in which the SRS is transmitted in case of the SRS. Meanwhile, if the RS from which the pathloss value can be obtained is the SRS, the parameter may include the ID of the BWP in which the SRS is transmitted, as well as the SRS resource index (SRS-ResourceId).

FIG. 9 illustrates a diagram illustrating another example of a method of transmitting pathloss linking information. As another example of pathloss linking, the base station may include linking information 910 of pathloss in an RRC parameter "SRS-SpatialRelationInfo" 900, and SRS-Spa-tialRelationInfo may be configured to the terminal via SRS-Config information element (IE). In this case, SRS-SpatialRelationInfo may be configured as shown in FIG. 9, and the parameters related to the linking information of pathloss are as follows.

As used herein, "servingCellId" is an index of the cell in which the downlink pathloss value can be referred to. In this case, the index of the cell may be the same as or different from the index of the cell in which the terminal transmits the SRS. If servingCellId is the same as the index of the cell for transmitting the SRS, the terminal may estimate a pathloss value using a downlink RS (the SSB or the CSI-RS) transmitted through the downlink cell index corresponding to the index of the corresponding cell. As another example of the case where the servingCellId is the same as the index of the cell for transmitting the SRS, the terminal may reuse the pathloss value applied to the SRS, which is transmitted (or which has been transmitted) through the index of the corresponding cell, in the SRS transmission. Meanwhile, if servingCellId is different from the index of the cell for transmitting the SRS, the terminal may estimate a pathloss value using the downlink RS transmitted through the downlink cell index corresponding to the index of the cell indicated by servingCellId, instead of the cell for transmitting the SRS. As another example of the case where servingCellId is different from the index of the cell for transmitting the PUSCH, the terminal may reuse the pathloss value applied to the SRS, which is transmitted (or which has been transmitted) through the index of the cell, in the SRS transmission.

referenceSignal: This denotes the type of RS from which the pathloss value can be obtained and the index of the RS resource. More specifically, this parameter indicates whether the type of the RS from which the pathloss value can be obtained is the SSB, the CSI-RS, or the SRS. In addition, the parameter denotes an index of a resource in which the SSB is transmitted in case of the SSB, denotes an index of a resource in which the CSI-RS is transmitted in the case of the CSI-RS, and denotes an index of a resource in which the SRS is transmitted in case of the SRS. Meanwhile, if the RS from which the pathloss value can be obtained is the SRS, the parameter may include the ID of the BWP in which the SRS is transmitted, as well as the SRS resource index (SRS-ResourceId).

FIG. 10 illustrates a diagram illustrating another example of a method of transmitting pathloss linking information. As another example of pathloss linking, the base station may include linking information 1010 of pathloss in an RRC parameter "PathlossReferenceRS" 1000, and PathlossReferenceRS may be configured to the terminal via SRS-Config information element (IE). In this case, PathlossReferenceRS may be configured as shown in FIG. 10, and the parameters related to the linking information of pathloss are as follows.

As used herein, "SRS-ResourceSet-Id" denotes the index of the SRS resource set. The base station may configure one or more SRS resource sets to the terminal for each BWP. For example, one BWP may have up to 16 SRS resource sets.

As used herein, "SRS-ResourceIdList" is a single SRS resource set may have one or more SRS resources. For example, a single SRS resource set may have up to 16 SRS resources (maxNrofSRS-ResourcesPerSet=16). SRS-ResourceIdList may indicate indexes of one or more SRS resources in the SRS resource set.

As used herein, "servingCellId" is an index of the cell in which the downlink pathloss value can be referred to. In this case, the index of the cell may be the same as or different from the index of the cell in which the terminal transmits the SRS. If servingCellId is the same as the index of the cell for transmitting the SRS, the terminal may estimate a pathloss value using a downlink RS (the SSB or the CSI-RS) transmitted through the downlink cell index corresponding to the index of the corresponding cell. As another example of the case where the servingCellId is the same as the index of the cell for transmitting the SRS, the terminal may reuse the pathloss value applied to the SRS, which is transmitted (or which has been transmitted) through the index of the corresponding cell, in the SRS transmission. Meanwhile, if servingCellId is different from the index of the cell for transmitting the SRS, the terminal may estimate a pathloss value using the downlink RS transmitted through the downlink cell index corresponding to the index of the cell indicated by servingCellId, instead of the cell for transmitting the SRS. As another example of the case where servingCellId is different from the index of the cell for transmitting the PUSCH, the terminal may reuse the pathloss value applied to the SRS, which is transmitted (or which has been transmitted) through the index of the cell, in the SRS transmission.

As used herein, "PathlossReferenceRS" denotes the type of RS from which the pathloss value can be obtained and the index of the RS resource. More specifically, this parameter indicates whether the type of the RS from which the pathloss value can be obtained is the SSB, the CSI-RS, or the SRS. In addition, the parameter denotes an index of a resource in which the SSB is transmitted in case of the SSB, denotes an index of a resource in which the CSI-RS is transmitted in the case of the CSI-RS, and denotes an index of a resource in which the SRS is transmitted in case of the SRS. Meanwhile, if the RS from which the pathloss value can be obtained is the SRS, the parameter may include the ID of the BWP in which the SRS is transmitted, as well as the SRS resource index (SRS-ResourceId). The same reference RS may be used for the pathloss determination in the SRS resource set. That is, if there are one or more SRS resources in a single SRS resource set, the terminal may transmit one or more SRSs. In this case, the same RS is used to refer to the pathloss used in the SRS transmission. That is, if the RS from which the pathloss value can be obtained is the SSB, the pathloss values for all SRS transmissions in the SRS resource set may have the same SSB index.

Figure 11:
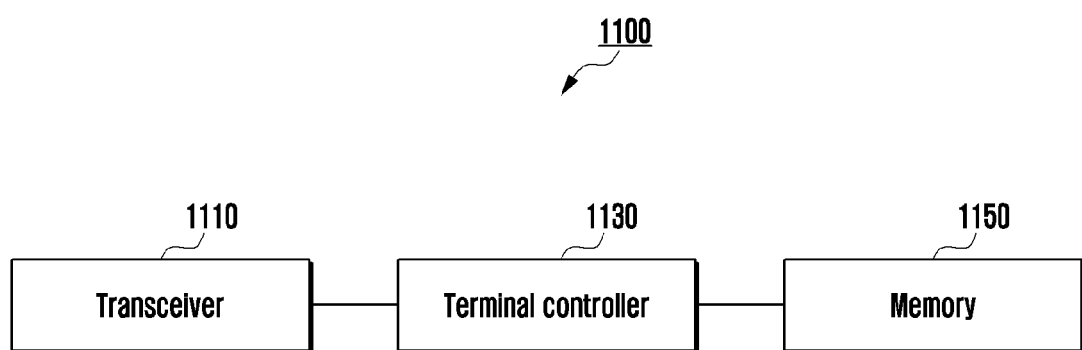
FIG. 11 illustrates a diagram illustrating the structure of a terminal according to an embodiment of the disclosure.

FIG. 11 illustrates a diagram illustrating the structure of a terminal 1100 according to an embodiment of the disclosure. Referring to FIG. 11, the terminal may include a transceiver 1110, a terminal controller 1130, and a memory 1150. The terminal controller 1130 may be implemented as a circuit, an application-specific integrated circuit, or at least one processor.

The transceiver 1110 transmits and receives signals to and from other network entities. The transceiver 1110 may be implemented in the form of a radio frequency (RF) unit including a modem, and may be implemented so as to be divided into a transmitter and a receiver. The terminal controller 1130 may control the overall operation of the terminal according to the above-described embodiments. For example, the terminal controller 1130 may estimate downlink pathloss for uplink transmission on the basis of information received from a base station, and may transmit an uplink signal to the base station on the basis of the estimated pathloss. The memory 1150 may store and manage information transmitted and received through the transceiver 1110 and information generated by the terminal controller 1130.

Figure 12:
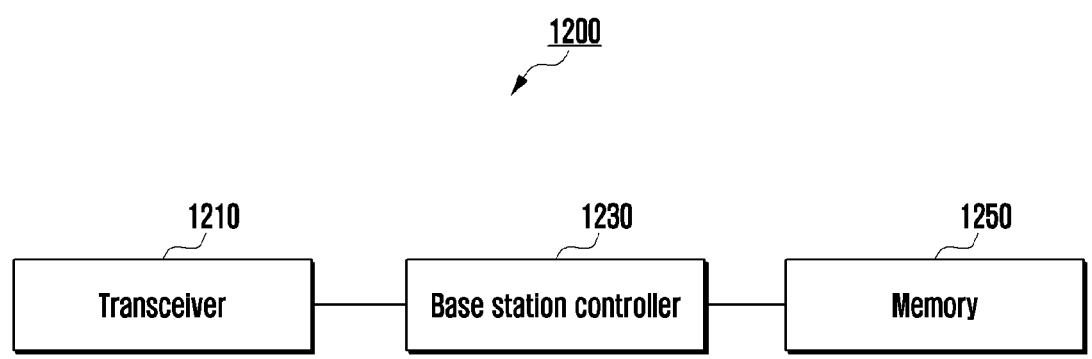
FIG. 12 illustrates a diagram illustrating the structure of a base station according to an embodiment of the disclosure.

FIG. 12 illustrates a diagram illustrating the structure of a base station 1200 according to an embodiment of the disclosure. Referring to FIG. 12, the base station may include a transceiver 1210, a base station controller 1230, and a memory 1250. The base station controller 1230 may be implemented as a circuit, an application-specific integrated circuit, or at least one processor.

The transceiver 1210 transmits and receives signals to and from other network entities. The transceiver 1210 may be implemented in the form of a radio frequency (RF) unit including a modem, and may be implemented so as to be divided into a transmitter and a receiver. The base station controller 1230 may control the overall operation of the base station according to the above-described embodiments. For example, the base station controller 1230 may transmit information for estimating pathloss to the terminal, and may receive an uplink signal transmitted with transmission power calculated on the basis of the corresponding information. The memory 1250 may store and manage information transmitted and received through the transceiver 1210 and information generated by the base station controller 1230.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station, a radio resource control (RRC) message;
   identifying whether information for a pathloss reference linking is included in the RRC message;
   transmitting, on a first serving cell to the base station, one of a physical uplink shared channel (PUSCH) transmission, a physical uplink control channel (PUCCH) transmission or a sounding reference signal (SRS) transmission based on a first transmission power, wherein the first transmission power is identified based on a downlink pathloss calculated by using a reference signal (RS) resource on an active downlink bandwidth part (BWP) of a second serving cell indicated by the information, in case that the information is included in the RRC message; and transmitting, on the first serving cell to the base station, one of the PUSCH transmission, the PUCCH transmission or the SRS transmission based on a second transmission power, wherein the second transmission power is identified based on a downlink pathloss calculated by using an RS resource on an active downlink BWP of the first serving cell, in case that the information is not included in the RRC message.

2. The method of claim 1, further comprising:
receiving, from the base station, first information on at least one RS resource for identifying a pathloss for the first serving cell and second information on at least one RS resource for identifying a pathloss for the second serving cell,
wherein the RS resource on the active downlink BWP of the first serving cell is identified based on the first information, and the RS resource on the active downlink BWP of the second serving cell is identified based on the second information.

3. The method of claim 2, wherein each of the at least one RS resource associated with the first information and the at least one RS resource associated with the second information comprises a synchronization signal (SS)/physical broadcast channel (PBCH) block, the SS/PBCH block including a primary synchronization signal (PSS), a secondary synchronization signal (SSS), a demodulation reference signal (DMRS) and a physical broadcast channel (PBCH).

4. The method of claim 2, wherein each of the at least one RS resource associated with the first information and the at least one RS resource associated with the second information comprises a channel state information reference signal (CSI-RS).

5. A method performed by a base station in a wireless communication system, the method comprising:
transmitting, to a terminal, a radio resource control (RRC) message;
receiving, on a first serving cell from the terminal, one of a physical uplink shared channel (PUSCH) transmission, a physical uplink control channel (PUCCH) transmission or a sounding reference signal (SRS) transmission based on a first transmission power, wherein the first transmission power depends on a downlink pathloss using a reference signal (RS) resource on an active downlink bandwidth path (BWP) of a second serving cell indicated by information for a pathloss reference linking, in case that the information for the pathloss reference linking is included in the RRC message; and
receiving, on the first serving cell from the terminal, one of the PUSCH transmission, the PUCCH transmission or the SRS transmission based on a second transmission power, wherein the second transmission power depends on a downlink pathloss using an RS resource on an active downlink BWP of the first serving cell, in case that the information for the pathloss reference linking is not included in the RRC message.

6. The method of claim 5, further comprising:
transmitting, to the terminal, first information on at least one RS resource for a pathloss for the first serving cell and second information on at least one RS resource for a pathloss for the second serving cell,
wherein the RS resource on the active downlink BWP of the first serving cell is identified based on the first information, and the RS resource on the active downlink BWP of the second serving cell is identified based on the second information.

7. The method of claim 6, wherein each of the at least one RS resource associated with the first information and the at least one RS resource associated with the second information comprises a synchronization signal (SS)/physical broadcast channel (PBCH) block, the SS/PBCH block including a primary synchronization signal (PSS), a secondary synchronization signal (SSS), a demodulation reference signal (DMRS) and a physical broadcast channel (PBCH).

8. The method of claim 6, wherein each of the at least one RS resource associated with the first information and the at least one RS resource associated with the second information comprises a channel state information reference signal (CSI-RS).

9. A terminal in a wireless communication system, the terminal comprising:
a transceiver configured to transmit and receive a signal; and
a controller configured to:
receive, from a base station, a radio resource control (RRC) message,
identify whether information for a pathloss reference linking is included in the RRC message,
transmit, on a first serving cell to the base station, one of a physical uplink shared channel (PUSCH) transmission, a physical uplink control channel (PUCCH) transmission or a sounding reference signal (SRS) transmission based on a first transmission power, wherein the first transmission power is identified based on a downlink pathloss calculated by using a reference signal (RS) resource on an active downlink bandwidth part (BWP) of a second serving cell indicated by the information, in case that the information is included in the RRC message, and
transmit, on the first serving cell to the base station, one of the PUSCH transmission, the PUCCH transmission or the SRS transmission based on a second transmission power, wherein the second transmission power is identified based on a downlink pathloss calculated by using an RS resource on an active downlink BWP of the first serving cell, in case that the information is not included in the RRC message.

10. The terminal of claim 9, wherein the controller is further configured to receive, from the base station, first information on at least one RS resource for identifying a pathloss for the first serving cell and second information on at least one RS resource for identifying a pathloss for the second serving cell, and
wherein the RS resource on the active downlink BWP of the first serving cell is identified based on the first information, and the RS resource on the active downlink BWP of the second serving cell is identified based on the second information.

11. The terminal of claim 10, wherein each of the at least one RS resource associated with the first information and the at least one RS resource associated with the second information comprises a synchronization signal (SS)/physical broadcast channel (PBCH) block, the SS/PBCH block including a primary synchronization signal (PSS), a secondary synchronization signal (SSS), a demodulation reference signal (DMRS) and a physical broadcast channel (PBCH).

12. The terminal of claim 10, wherein each of the at least one RS resource associated with the first information and the at least one RS resource associated with the second information comprises a channel state information reference signal (CSI-RS).

13. A base station in a wireless communication system, the base station comprising:
 a transceiver configured to transmit and receive a signal; and
 a controller configured to:
  transmit, to a terminal, a radio resource control (RRC) message,
  receive, on a first serving cell from the terminal, one of a physical uplink shared channel (PUSCH) transmission, a physical uplink control channel (PUCCH) transmission or a sounding reference signal (SRS) transmission based on a first transmission power, wherein the first transmission power depends on a downlink pathloss using a reference signal (RS) resource on an active downlink bandwidth part (BWP) of a second serving cell indicated by information for a pathloss reference linking, in case that the information for the pathloss reference linking is included in the RRC message, and
  receive, on the first serving cell from the terminal, one of the PUSCH transmission, the PUCCH transmission or the SRS transmission based on a second transmission power, wherein the second transmission power depends on a downlink pathloss using an RS resource on an active downlink BWP of the first serving cell, in case that the information for the pathloss reference linking is not included in the RRC message.

14. The base station of claim 13, wherein the controller is further configured to transmit, to the terminal, first information on at least one RS resource for a pathloss for the first serving cell and second information on at least one RS resource for a pathloss for the second serving cell, and
 wherein the RS resource on the active downlink BWP of the first serving cell is identified based on the first information, and the RS resource on the active downlink BWP of the second serving cell is identified based on the second information.

15. The base station of claim 14, wherein each of the at least one RS resource associated with the first information and the at least one RS resource associated with the second information comprises a synchronization signal (SS)/physical broadcast channel (PBCH) block, the SS/PBCH block including a primary synchronization signal (PSS), a secondary synchronization signal (SSS), a demodulation reference signal (DMRS) and a physical broadcast channel (PBCH).

16. The base station of claim 14, wherein each of the at least one RS resource associated with the first information and the at least one RS resource associated with the second information comprises a channel state information reference signal (CSI-RS).

\* \* \* \* \*